US007177327B2

(12) United States Patent
Murata

(10) Patent No.: US 7,177,327 B2
(45) Date of Patent: Feb. 13, 2007

(54) CIRCUIT TERMINATION METHOD AND A CIRCUIT TERMINATING APPARATUS

(75) Inventor: Shigeru Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1134 days.

(21) Appl. No.: 10/092,963

(22) Filed: Mar. 5, 2002

(65) Prior Publication Data

US 2002/0122477 A1    Sep. 5, 2002

Related U.S. Application Data

(63) Continuation of application No. PCT/JP99/05680, filed on Oct. 14, 1999.

(51) Int. Cl.
 H04J 3/06    (2006.01)
 H04J 3/22    (2006.01)

(52) U.S. Cl. .................... 370/503; 370/545
(58) Field of Classification Search ............ None
 See application file for complete search history.

(56) References Cited

U.S. PATENT DOCUMENTS

| | | | | |
|---|---|---|---|---|
| 5,719,859 A | * | 2/1998 | Kobayashi et al. | 370/347 |
| 5,734,867 A | * | 3/1998 | Clanton et al. | 370/461 |
| 5,748,624 A | * | 5/1998 | Kondo | 370/347 |
| 5,999,563 A | * | 12/1999 | Polley et al. | 375/222 |
| 6,046,983 A | * | 4/2000 | Hasegawa et al. | 370/236.1 |
| 6,240,076 B1 | * | 5/2001 | Kanerva et al. | 370/330 |
| 6,252,900 B1 | * | 6/2001 | Liu et al. | 375/219 |
| 6,400,929 B1 | * | 6/2002 | Ue et al. | 370/468 |
| 6,628,667 B1 | * | 9/2003 | Murai et al. | 370/468 |
| 6,693,885 B1 | * | 2/2004 | Sydon et al. | 370/337 |

FOREIGN PATENT DOCUMENTS

| | | |
|---|---|---|
| JP | 56061848 | 5/1981 |
| JP | 60010843 | 1/1985 |
| JP | 01302934 | 12/1989 |
| JP | 04100360 | 4/1992 |
| JP | 04144451 | 5/1992 |
| JP | 04223668 | 8/1992 |
| JP | 06188940 | 7/1994 |

OTHER PUBLICATIONS

International Search Report dated Jan. 18, 2000 for International Application No. PCT/JP99/05680.

* cited by examiner

Primary Examiner—Chi Pham
Assistant Examiner—Anh-Vu Ly
(74) Attorney, Agent, or Firm—Katten Muchin Rosenman LLP

(57) ABSTRACT

The present invention relates to a circuit termination method and a circuit terminating apparatus that are used for metallic circuits that offer high-speed communication. When a transmission speed is required to be changed due to a change in conditions of a circuit and the like through an opposite circuit terminating apparatus, a service suspension and resumption of a predetermined bit position common to each frame of multi frames, and a service suspension and resumption of a continuous bit string of a predetermined bit length starting from a predetermined bit position of a predetermined frame of the multi frames are performed, and an inputting speed and an outputting speed of a terminal connected to the circuit terminating apparatus is adjusted to be consistent with a transmission speed between the circuit terminating apparatus and a second circuit terminating apparatus.

13 Claims, 10 Drawing Sheets

Ts: SERVICE SUSPENSION BIT SETTING PERIOD

FIG.9
a) WHEN OPERATING AT MAXIMUM SPEED
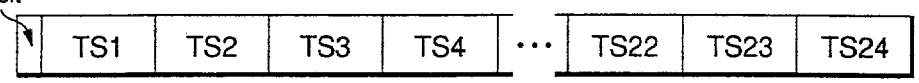
b) AT FALL-BACK
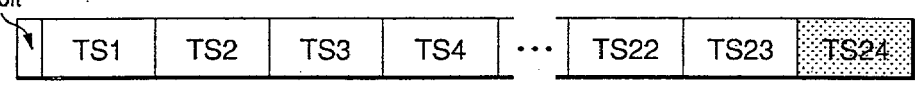
FIG.10
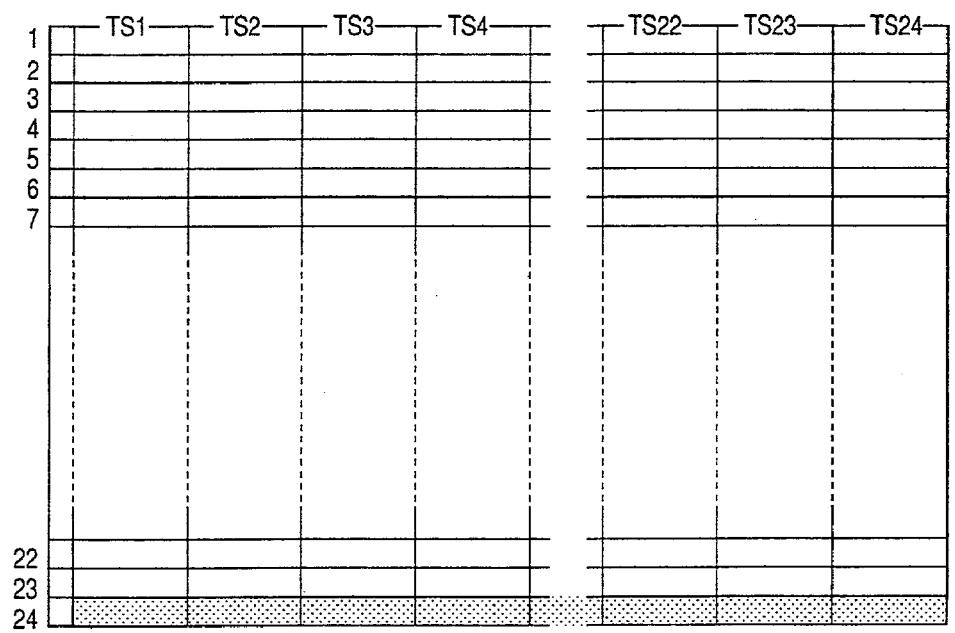

FIG.11
a) NORMAL CONDITION
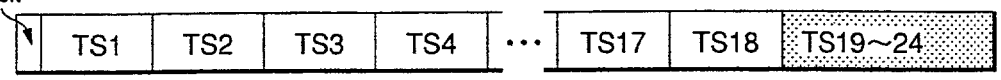
b) COMMON FRAME METHOD
FIG.12
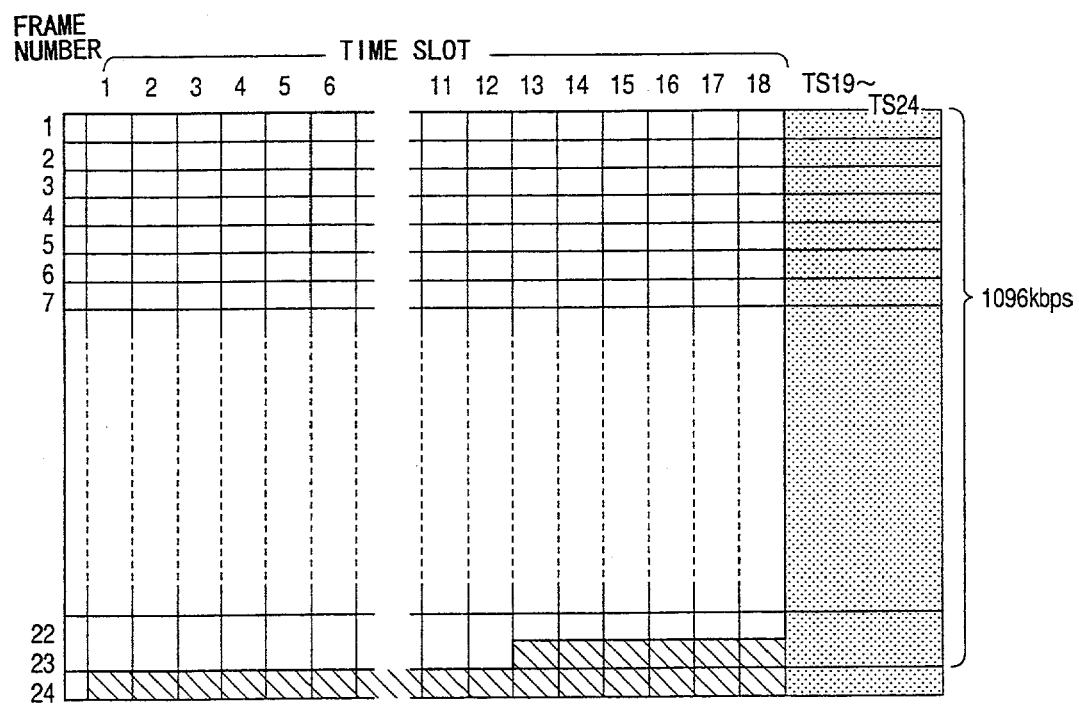

CIRCUIT TERMINATION METHOD AND A CIRCUIT TERMINATING APPARATUS

This is a continuation of international application number PCT JP99/05680, filed Oct. 14, 1999.

BACKGROUND OF THE INVENTION

1. Field of the Invention

The present invention relates to a circuit termination method and a circuit terminating apparatus, and especially to the circuit termination method and the circuit terminating apparatus that are used in a metallic circuit and the like for high-speed communication.

2. Description of the Related Art

Various transmission systems have been studied for utilization with existing metallic circuits for high-speed data transmission. A metallic circuit tends to be subjected to unstable circuit conditions, and transmission quality may deteriorate, as compared with an optical cable.

Conventionally, when a circuit condition for a modem used on a common carrier leased line got worse, required communication quality under the poor circuit condition was generally achieved by using a fall back facility of the modem and thus lowering a clock rate to a terminal.

In the case of the modem, a clock signal line in a terminal interface is an independent line, and the modem adjusts an amount of data input and output according to width of a clock pulse.

Conversely, in the case of a high speed data transmission terminal that uses an existing metallic circuit between an office and a subscriber, the terminal is usually provided with a frame multiplex interface (for example, I-interface) with no independent clock signal line, therefore, the conventional technology cannot be used as it is.

When lowering a transmission speed due to deteriorated transmission quality, it is important to provide a service that corresponds to the class of the terminal and a level of reduction of the transmission speed such that a minimum transmission quality of the whole network is maintained.

As to the high speed data transmission terminal, there are various implementations, such as a TDM (Time Division Multiplex) terminal that physically multiplexes two or more channels, a frame relay terminal that transmits two or more logical channels over one physical interface, and an ATM (Asynchronous Transfer Mode) multiplexing apparatus, in addition to ones that offer one communication channel over one interface.

When changing the transmission speed of the variety of terminal apparatuses in response to deteriorated transmission quality, a circuit terminating apparatus has to control providing and suspending of service to each terminal.

SUMMARY OF THE INVENTION

The present invention addresses the problems and shortcomings of the conventional technology as mentioned above, and aims at offering a required communication quality by adjusting service suspending conditions according to a circuit condition and a class of a connected terminal in a circuit terminating apparatus that accommodates a terminal interface of a frame-multiplex format.

As will be described hereunder, when offering a high-speed data transmission in a metallic circuit, a stable operation can be realized by providing the following facilities in the circuit terminating apparatus, namely (1) storing connection terminal information, (2) providing a function to slow down a transmission speed according to a transmission speed of a circuit section, and (3) generating a service suspending bit position at the time of the transmission speed reduction, according to the class of the terminal.

According to the present invention, a circuit termination method of a circuit terminating apparatus with a terminal side interface of a frame synchronization method taking a multi frame configuration includes the steps of updating a transmission speed according to a condition of a circuit between a first circuit terminating apparatus and a second circuit termination apparatus, performing a service suspension and resumption of a predetermined bit position common to each frame of the multi frame, and adjusting inputting speed and outputting speed of a terminal connected to the first circuit terminating apparatus to the updated transmission speed between the first circuit terminating apparatus and the second circuit terminating apparatus.

According to another aspect of the present invention, a circuit termination method of a circuit terminating apparatus with a terminal side interface of a frame synchronization method taking a multi frame configuration includes the steps of checking whether a synchronous speed established by a first circuit terminating apparatus and a second circuit terminating apparatus at an operation start is faster or slower than a contracted speed of a terminal connected to the first circuit terminating apparatus, performing a service suspension and resumption of a predetermined bit position common to each frame of the multi frame to update the synchronous speed, if the established synchronous speed is slower than the contracted speed, and adjusting an inputting speed and an outputting speed of the terminal to the updated speed between the first circuit terminating apparatus and the second circuit terminating apparatus.

Other objects, features, and advantages of the present invention will become clearer by reading a following explanation, referring to an attached drawing.

BRIEF DESCRIPTION OF THE DRAWINGS

FIG. 2 is a figure for explaining when service suspension processing as shown in FIG. 1 is performed in the case of a frame relay terminal, an ATM multiplex terminal, and the like.

FIG. 8 is a figure for explaining timing, such as a service suspension, in the case of a frame relay terminal, an ATM multiplex terminal, and the like.

FIG. 9 is a figure for explaining a bit position of a service suspension when a fall back takes place in the case of a TDM terminal.

FIG. 10 is a figure for explaining a bit position of a service suspension when a fall back takes place in the case of a frame relay terminal, an ATM multiplex terminal, and the like.

FIG. 11 is a figure for explaining a bit position of a service suspension, wherein a contracted speed and a circuit condition are taken into consideration in the case of a TDM terminal.

FIG. 12 is a figure for explaining a bit position of a service suspension, wherein a contracted speed and a circuit condition are taken into consideration in the case of a frame relay terminal, an ATM multiplex terminal, and the like.

DESCRIPTION OF THE PREFERRED EMBODIMENTS

In the following, the present invention will be described using drawings.

Figure 1:
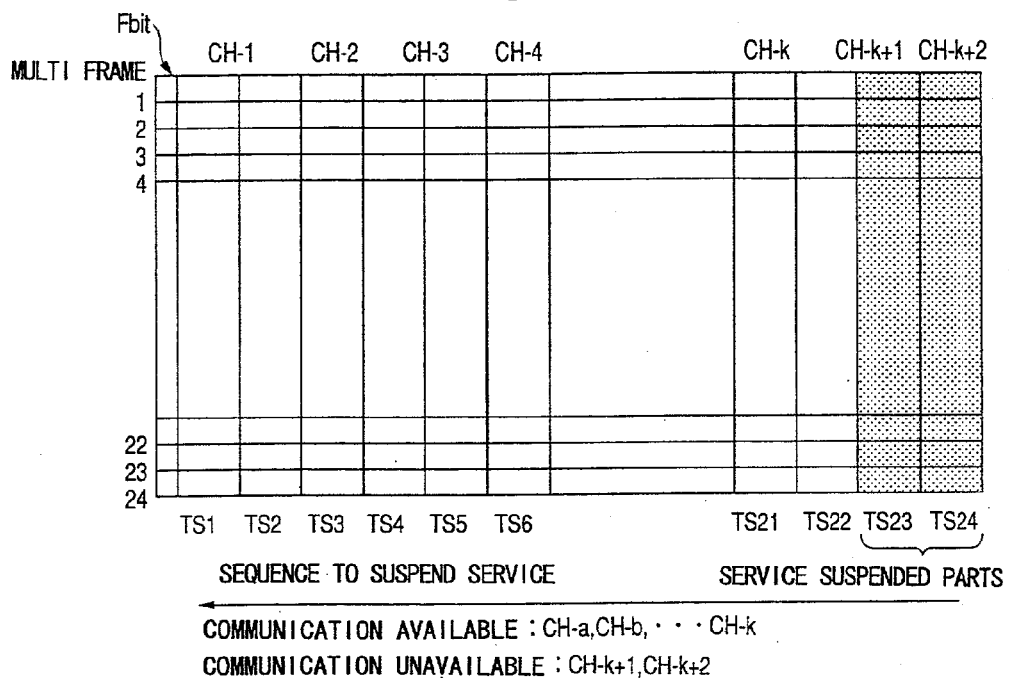
FIG. 1 is a figure for explaining how service suspension processing is performed in the case of a TDM terminal.

FIG. 1 shows how the service suspension process is performed in the case of a TDM terminal. A multi frame configuration includes 24 frames, each frame having time slots TS1 through TS24. Each time slot is assigned with channels CH1 through CHk+2. Each time slot is assigned with a predetermined priority sequence for service suspension. In the case of FIG. 1, the priority to suspend the service is the highest at the time slot TS24, and the priority is the lowest at the time slot TS1.

When lowering the transmission speed due to deteriorated transmission quality in this frame structure, a service for bit positions of the time slot TS24 and the time slot TS23 is suspended in FIG. 1.

When suspending the service, the circuit terminating apparatus suspends transmission and reception allocations of a predetermined number of bits from bit positions common to each frame. Consequently, a communication channel that is not using the suspended bit positions can continue communication.

Moreover, if the bit positions at the time of a service suspension are provided to the terminal side, an operator can beforehand specify bit positions on the transmission line according to the priority of communication, and important communication can continue even under a deteriorated circuit condition.

In the case of a frame relay or an ATM multiplexing apparatus, a communication channel is composed of a data stream of cells or frames. This data stream is transmitted bit by bit from a terminal, and it is hard to tell which channel is set at which bit position.

Here, if the service suspension processing by the bit position common to each frame that is adequate for the TDM terminal is applied to terminals using frame relay and ATM multiplexing, communication may become impossible on all data streams.

Figure 2:
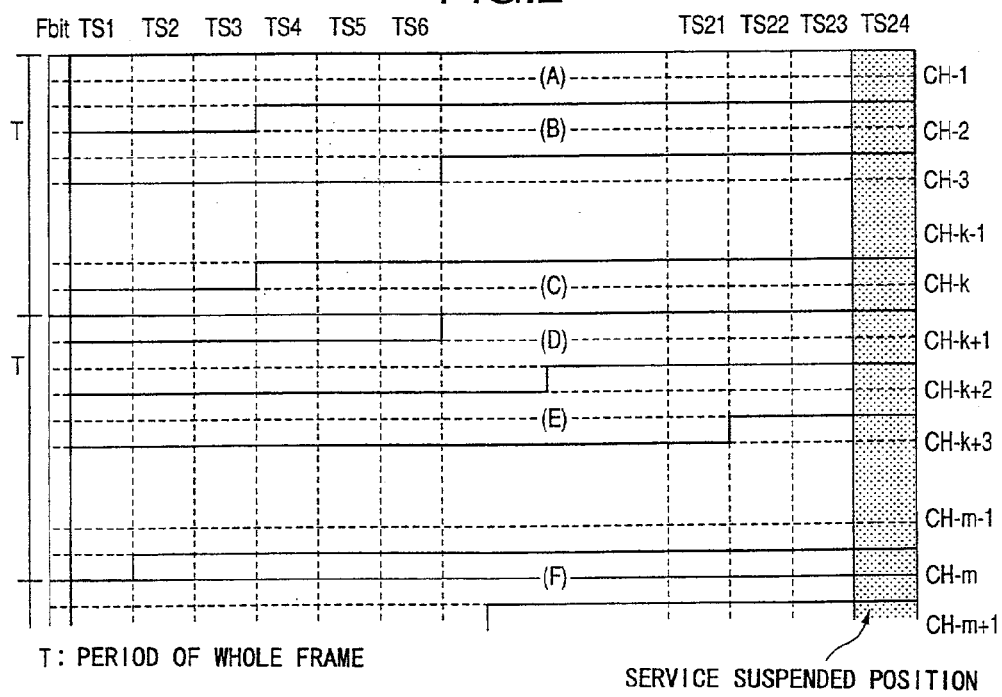

This situation is shown in FIG. 2. Each of frames (A) through (F) uses 24 time slots or more. In this case, even if only one time slot TS24 is suspended, all frames are affected and communication of all channels becomes impossible. If a frame uses 23 or less time slots, not all channels may be affected. However, it is hard to predict which frames will be affected, and preventive means cannot be provided to ensure communication for an important channel.

Thus, the service suspension processing for a frame relay terminal or an ATM multiplexing apparatus wherein continuous bits are assigned to a frame at the time of a transmission speed slowdown requires a method, unlike in a TDM terminal, that will be described below.

Figure 3:
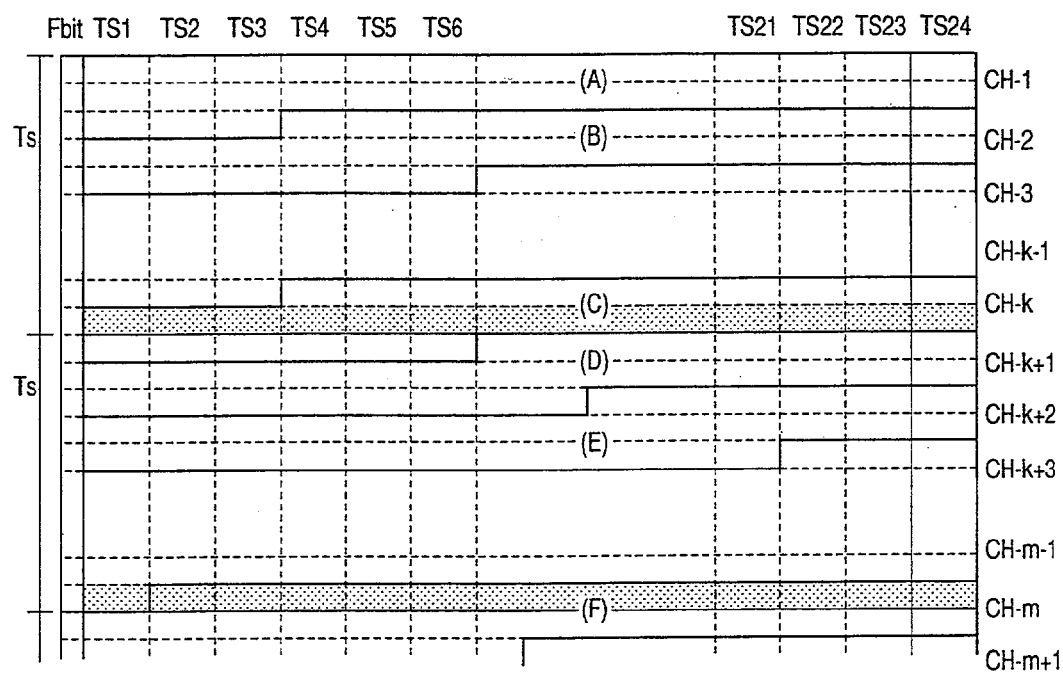
FIG. 3 is a figure for explaining how service suspension processing is performed in the case of a frame relay terminal, an ATM multiplex terminal, and the like that have continuous bits.

That is, in the case of a frame relay terminal or an ATM multiplexing apparatus, a period during which the service is suspended is set up continuously from a certain frame, as shown in FIG. 3.

In FIG. 3, shaded areas represent the service suspension periods. Among frames (A) through (F) in FIG. 3, which are the same frames as shown in FIG. 2, the frame (C) and the frame (F) cannot continue communication, however, other frames can continue communication.

In this manner, it is important to select an appropriate processing method for controlling service availability according to terminal specifications in a circuit that may have a speed fluctuation during communication.

Further, a high quality network performance can be obtained by providing the circuit terminating apparatus with a function to enter into a re-negotiation when a pre-registered signal pattern and the like is detected by monitoring a main signal from a terminal by a circuit terminating apparatus.

Figure 4:
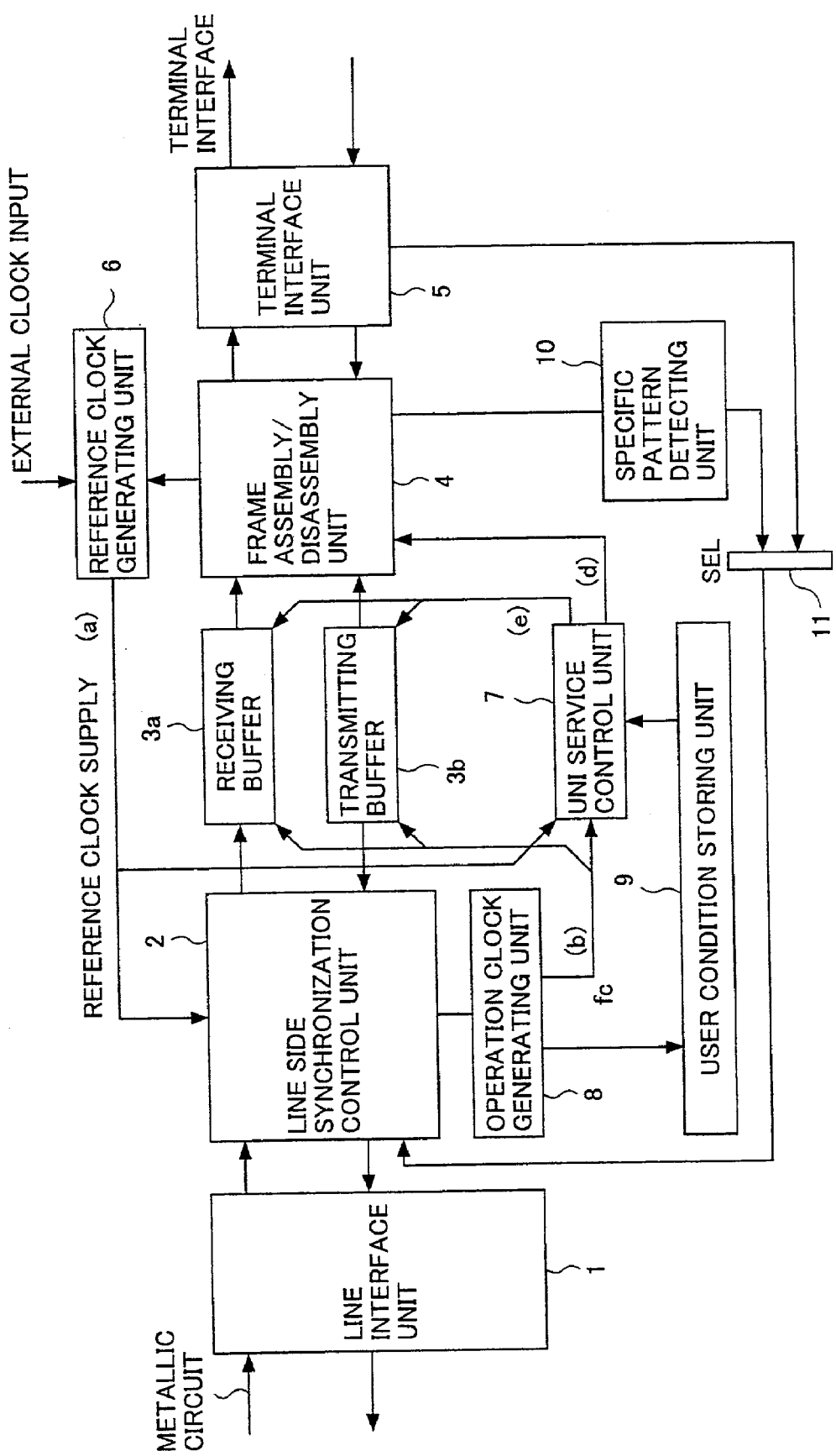
FIG. 4 is a block diagram for explaining an embodiment of a circuit terminating apparatus of the present invention.

An example of a functional block of a circuit terminating apparatus of the present invention is shown in FIG. 4. The functional block of the circuit terminating apparatus of FIG. 4 includes a line interface unit 1, a line side synchronous control unit 2, a receiving buffer 3a, a transmitting buffer 3b, a frame assembly/disassembly unit 4, a terminal interface unit 5, a reference clock generating unit 6, a UNI service control unit 7, an operation clock generating unit 8, a user condition storing unit 9, a specific pattern detecting unit 10, and a selector 11.

The line interface unit 1 interfaces a line portion with an internal logical circuit.

The line side synchronous control unit 2 performs a synchronization negotiation with a counterpart circuit terminating apparatus (circuit terminating apparatus on the opposite side of a communication line), and determines a transmission speed.

The receiving buffer 3a is a buffer for communication from a metallic circuit to a terminal.

The transmitting buffer 3b is a buffer for communication from a terminal to a metallic circuit.

The frame assembly/disassembly unit 4 performs assembly/disassembly of a frame of a terminal interface based on information from the UNI service control unit 7.

The terminal interface unit 5 performs interface conversion between the terminal portion and the internal logical circuit, and includes a synchronous condition monitoring unit that supervises status of synchronization with the terminal.

The reference clock generating unit 6 extracts a reference clock signal from the terminal, extracts an external clock signal, generates and supplies a reference clock, and so on. The reference clock generating unit 6 stores information relative to the maximum transmission speed of a circuit to be used, and supplies the maximum transmission speed clock, i.e., the reference clock, to each block by a clock of its own or an externally inputted clock.

Figure 5:
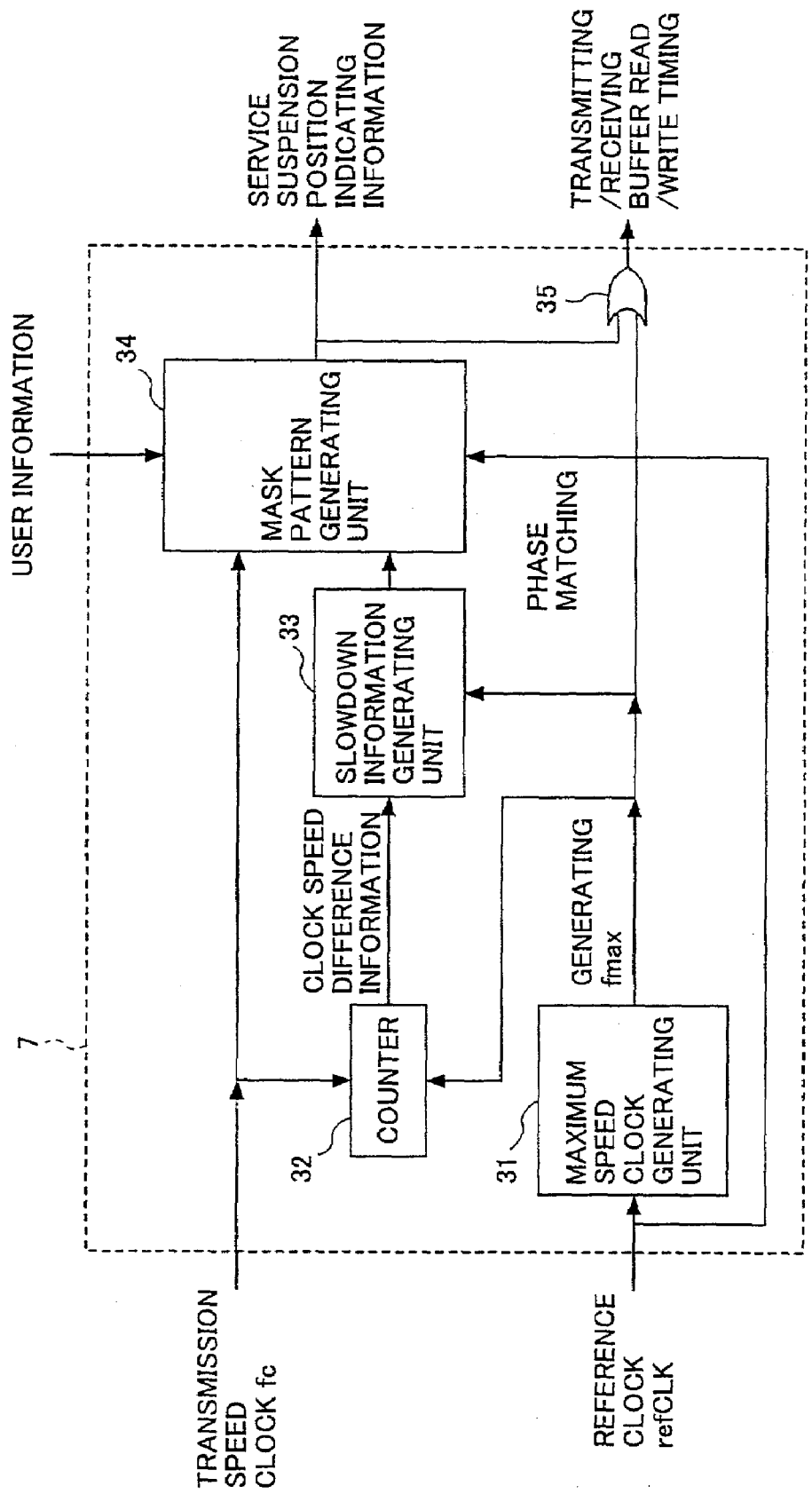
FIG. 5 is a block diagram of a UNI (User Network Interface) service control unit.

The UNI service control unit 7 generates and suspends a clock pulse according to user conditions and circuit conditions. An example of a block structure of the UNI service control unit 7 is shown in FIG. 5. The UNI service control unit 7 includes a maximum speed clock generating unit 31, a counter 32, a slowdown information generating unit 33, a mask pattern generating unit 34, and an OR circuit 35. The maximum speed clock generating unit 31 generates a maximum speed clock by stepping up the reference clock. However, if the reference clock generating unit 6 outputs pulses n times (n is an integer of two or higher) as fast as the maximum speed clock, the maximum speed clock is generated by stepping down the reference clock.

The operation clock generating unit 8 supplies an internal clock from negotiation conditions with the terminal.

The user condition storing unit 9 stores user information, such as a terminal specification and a contracted circuit speed. Further, it compares a transmission speed with the contracted speed.

The specific pattern detecting unit 10 continuously supervises a data pattern on the terminal side and the line side, and transmits a re-negotiation demand signal to the line side synchronous control unit 2 when a re-negotiation demand from a terminal and an idling are detected.

The selector 11 chooses signals from the specific pattern detecting unit 10, and from the terminal interface unit 5, and provides a selected signal to the line side synchronous control unit 2.

Figure 6:
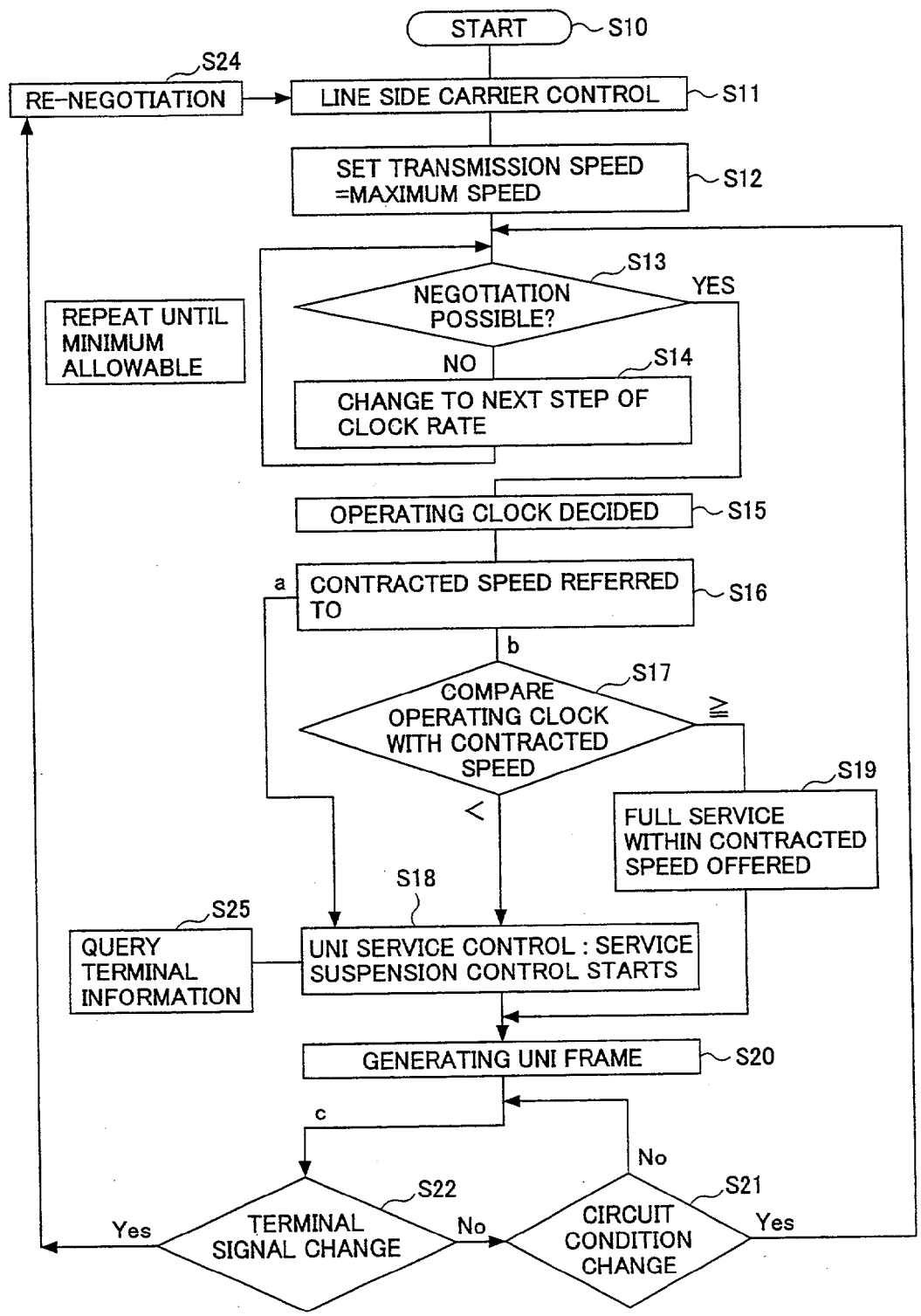
FIG. 6 is a flowchart for explaining an operation flow of the present invention.

Next, an operation of the circuit terminating apparatus is described using FIGS. 4 through 6.

First, the line side synchronous control unit 2 performs line side carrier control (S11), performs negotiation with a countering apparatus, and determines a transmission speed.

The transmission speed is decided by first providing the maximum speed (S12). A check is made whether a negotiation is possible at this transmission speed (S13). If the negotiation is impossible, a clock rate is changed to a next rate representing a speed slower by a predetermined amount (S14). Then, a check is made again whether a negotiation is possible (S13). The clock rate is lowered until a negotiation becomes successful. The transmission speed at which the successful negotiation is obtained is made the operation clock fc (S15).

Subsequently, when changing the transmission speed due to a condition change in a circuit to the countering circuit terminating apparatus, the UNI service control unit 7 starts a service suspension control (S18) with reference to a contracted speed (S16:a), terminal information (S25), and the like, and generates a UNI frame (S20). In the case of a TDM terminal, communication is performed in this state (for example, FIG. 1).

When changing transmission speed by checking whether the speed is faster than the contracted speed of the terminal connected to the circuit terminating apparatus, the user condition storing unit 9 refers to a user's contracted speed (S16:b), compares the operation clock from the operation clock generating unit 8 with the contracted speed (S17), and provides a result to the UNI service control unit 7. The UNI service control unit 7 starts the service suspension control (S18) with reference to the result of the comparison of the operation clock with the contracted speed, the contract speed, the terminal information, and the like (S25), and generates the UNI frame (S20). When an operation clock is slower than the contract speed, service is offered at the rate of the operation clock. If, to the contrary, the operation clock is faster than the contract speed, full service is offered within the contract speed (S19). In the case of a frame relay terminal, an ATM multiplex terminal, and the like, communication is performed in this state (for example, FIG. 3).

Then, a check is made whether there is a change in a terminal signal (S22). If a specific pattern that is a signal for a re-negotiation is detected or an unstable state continues longer than a fixed period, a re-negotiation will be performed (S24). In the re-negotiation, process steps from S11 are performed to obtain an optimal state.

Further, a circuit condition is monitored for change (S21), and when the circuit condition changes, the process moves on to S13 and the maximum transmission speed is reconfigured in accordance with the change in the circuit condition.

Figure 7:
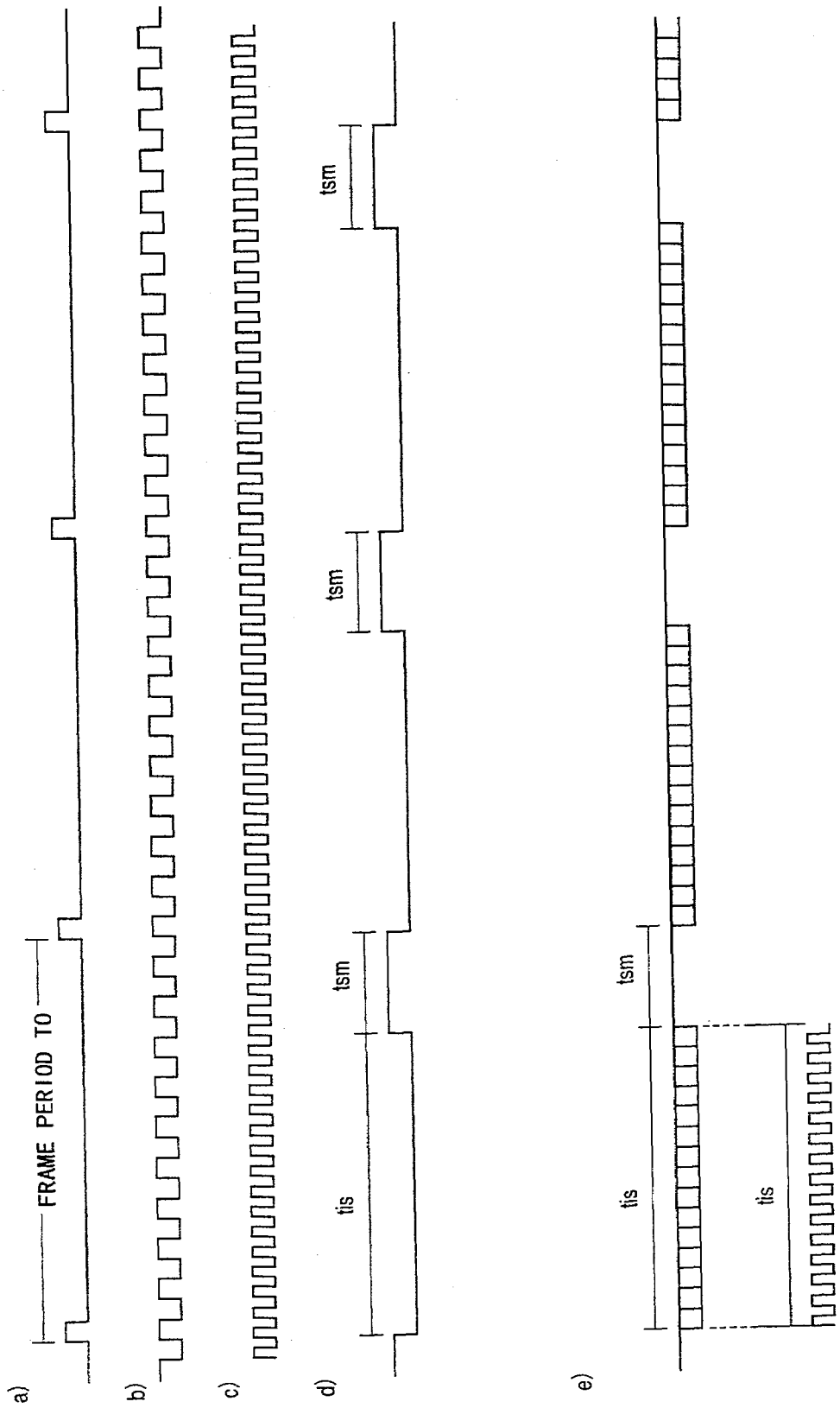
FIG. 7 is a figure for explaining timing, such as a service suspension, in the case of a TDM terminal.

FIG. 7 is a figure for explaining timing, such as a service suspension in the case of a TDM terminal.

(a) is the reference clock and is supplied from the reference clock generating unit 6. A pulse is outputted every frame period T0.

(b) is the transmission speed clock fc and is outputted from the operation clock generating unit 8 as a result of a negotiation.

(c) shows the maximum speed clock (frequency fmax). It is generated by the maximum speed clock generating unit 31 of the UNI service control unit 7 of FIG. 5.

(d) is an output of the mask pattern generating unit 34 of FIG. 5, and is a mask signal for a service suspension, provided to the frame memory assembly/disassembly unit 4 from the UNI service control unit 7. Based on this signal, the frame memory assembly/disassembly unit 4 offers service during the interval tis, and suspends service during the interval tsm.

Here, the frame period T0 is a sum of tis and tsm.

$$T0 = tis + tsm \quad \ldots (1)$$

(e) is an output of the OR circuit 35 of FIG. 5, which is an OR signal between the above mentioned (c) signal and the (d) signal. Reading and writing of the receiving buffer 3a and transmitting buffer 3b are performed by the OR signal.

Here, $$fc = tis \times fmax / T0 \quad \ldots (2)$$

With the operation clock fc decided, tis and tsm are obtained by the formula (2).

Figure 8:
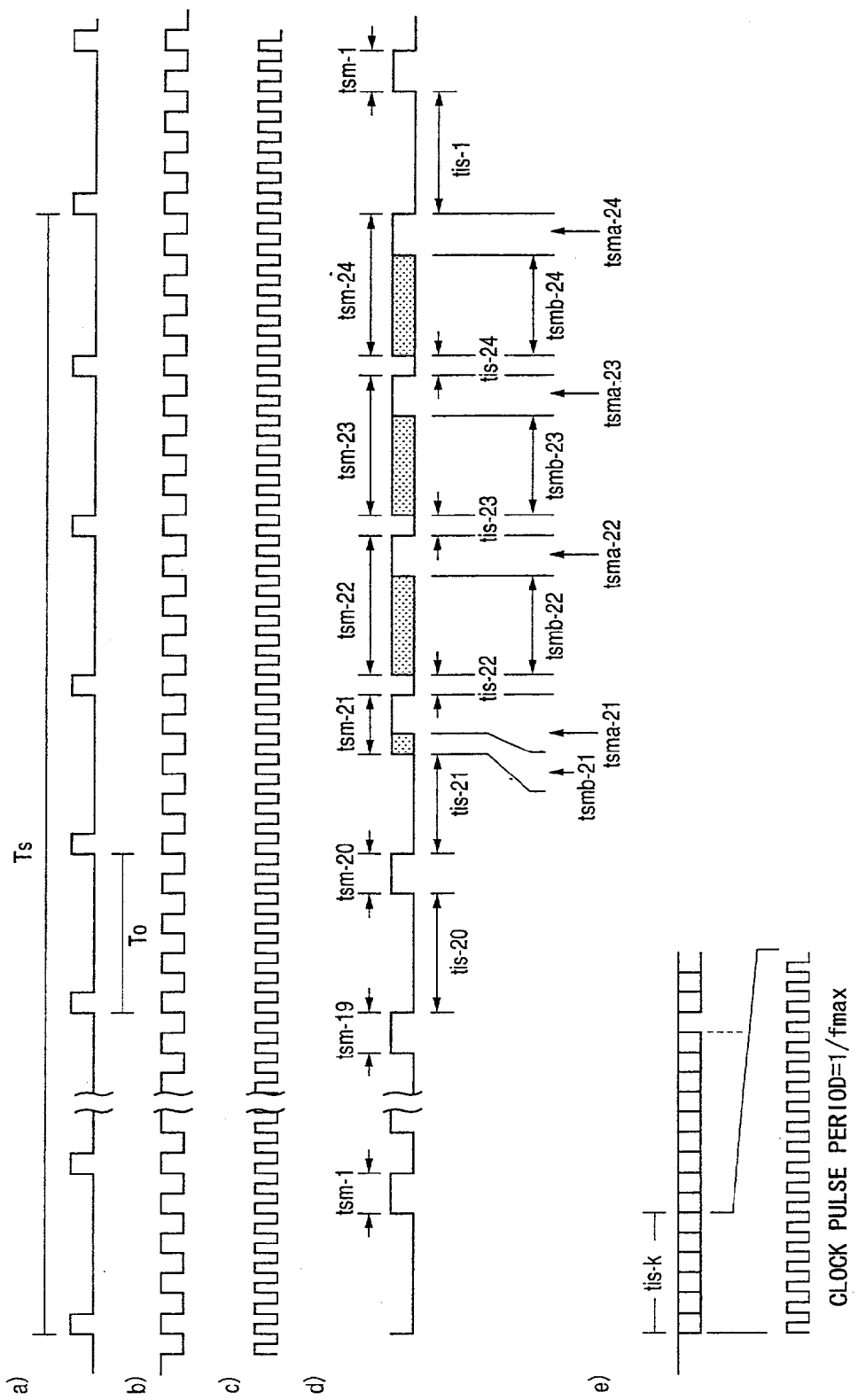

FIG. 8 is a figure for explaining timing, such as a service suspension, in the case of a frame relay terminal, an ATM multiplex terminal, and the like.

(a) is the reference clock and is supplied from the reference clock generating unit 6. A pulse is outputted every frame period T0.

The service suspension bit setting cycle Ts is equivalent to, e.g., a period of multi frames.

Here, $$Ts = mT0$$

(where m is the number of multi frames).

(b) is the transmission speed clock fc and is outputted from the operation clock generating unit 8 as a result of a negotiation.

(c) shows the maximum speed clock (frequency fmax). It is generated in the maximum speed clock generating unit 31 in the UNI service control unit 7 of FIG. 5.

(d) is a mask signal for a service suspension, provided from the UNI service control unit 7 to the frame memory assembly/disassembly unit 4. Based on this signal, the frame memory assembly/disassembly unit 4 offers service during the interval tis, and suspends service during the interval tsm. In addition, a number given to tis and tsm in each successive frame periods, for example, "k" of tis-k indicates a frame position in the k-th frame of multi framing, (that is, tis-k means the tis of the k-th frame).

Accordingly, tis-k represents a period of the k-th frame during which service is offered, and tsm-k represents a period of the k-th frame during which the service is not offered. Further, tsma-k represents a suspension period of the service of the k-th frame according to a circuit contract, and tsmb-k represents a suspension period of the service of the k-th frame based on a circuit condition. Here, $$Tsm-k = tsma-k + tsmb-k \qquad \ldots (3)$$

$$Ts = m(tis-k + tsm-k) \qquad \ldots (4)$$

In the figure, frames 1 through 20 are masked by tsm, that is, a service suspension period based on the circuit contract. Frames 21 through 24 are masked by the service suspension period due to the circuit contract (tsma), and additionally by the service suspension period due to a slowdown of the transmission speed (tsmb:shaded areas).

(e) is an OR signal of the (c) signal and the (d) signal. By this signal, reading and writing of the receiving buffer 3a and the transmitting buffer 3b are performed.

Here, $$fc = \frac{1}{Ts} \sum_{k=1}^{m} (tis - k \times f \max) \qquad (5)$$

FIG. 9 shows an example of a TDM terminal communicating at the maximum transmission speed of 1544 kbps using all time slots (a). To fall back to 1480 kbps (b), a service suspension of only the time slot TS24 is carried out.

In an example shown by FIG. 10, any of a frame relay terminal, an ATM multiplex terminal, and the like is communicating at the maximum transmission speed of 1544 bps using all the time slots (a). To fall back to 1480 kbps (b), a service suspension of only the 24th frame of the multi frames is performed.

FIG. 11 shows an example of a TDM terminal communicating at a contracted speed of 1152 kbps (a) where the time slots TS19 through TS24, representing the difference of 392 kbps from the maximum capacity of 1544 kbps, are suspended to obtain the contracted speed. When a transmission speed fall back to 1096 kbps is required (b), the difference of 56 kbps is realized by further masking the time slot TS18.

FIG. 12 shows an example of any of a frame relay terminal, an ATM multiplex terminal, and the like communicating at a contracted speed of 1152 kbps where the time slots TS19 through TS24, representing the difference of 392 kbps from the maximum capacity of 1544 kbps, are suspended, to obtain the contracted speed. When a transmission speed fall back to 1096 kbps is required, the time slots TS13 through TS18 in the 23$^{rd}$ frame and the time slots TS1 through TS18 in the 24$^{th}$ frame are suspended, which represent the difference of 56 kbps.

In the following, more details of operation modes of different terminals will be described.

(A) Service suspension processing in the case of a TDM terminal

An operation flow of the service suspension processing in the case of a TDM terminal selects "a" in FIG. 6, without going through "b" or "c". A service operation bit that is provided to a terminal input/output according to a transmission speed, and a service suspension bit that is not provided to the terminal input/output are generated on a frame of the terminal interface, with reference to user terminal specification information registered beforehand in the user condition storing unit 9 after having decided the transmission speed by establishing synchronization with a countering circuit terminating apparatus.

In this case, as shown in FIG. 1, bit positions of service operation and service suspension are common to all frames.

Service suspension timing receives the information from the user condition storing unit 9, and the UNI service control unit 7 generates the service suspension timing.

The service suspension timing counts such that the number of bits that are suspended becomes equal in each frame by the reference clock supplied from the reference clock generating unit 6. Further, mask timing is generated so that the buffer unit 3a for communicating with the circuit and the buffer unit 3b for communicating with the terminal may not operate during the suspension period.

Further, the frame assembly/disassembly unit 4 assigns an actual frame structure of the terminal input/output, and service operation/suspension bit using information from the UNI service control unit 7.

The terminal interface 5 physically interfaces this frame assembly/disassembly unit 4 with an actual terminal interface. FIG. 1 shows the input/output state of the terminal interface 5.

(B) Service suspension processing in the case of a frame relay terminal, an ATM multiplex terminal, and the like.

An operation flow of the service suspension processing in the case of a frame relay terminal, an ATM multiplex terminal, and the like selects "a" in FIG. 6, without going through "b" and "c". A service operation bit that is provided to a terminal input/output according to a transmission speed, and a service suspension bit that is not provided to the terminal input/output are generated on a frame of the terminal interface, with reference to user terminal specification information registered beforehand in the user condition storing unit 9 after having decided the transmission speed by establishing a synchronization with a countering circuit terminating apparatus.

In this case, the service for a bit string starting from a specific frame is suspended, for example, as shown in FIG. 3.

Although the appearance of service operation bits and suspension bits is periodic, the period is equal to or longer than a period of the whole frame, which a terminal interface specifies. The period length which the service suspend bits set up is Ts.

Service suspension timing receives information from the user condition storing unit 9, and the UNI service control unit 7 generates the timing of a service suspension.

The service suspension timing continuously chooses and counts the number of bits that carries out a service suspension, within the range of Ts, by the reference clock supplied from the reference clock generating unit 6. During the suspension period, mask timing is generated so that the buffer unit 3a for communicating with the circuit and the buffer unit 3b for communicating with the terminal will not operate.

The frame assembly/disassembly unit 4 assigns a frame structure of actual terminal input/output, and service operation/suspend bit in response to this timing.

Further, the terminal interface 5 physically interfaces this frame assembly/disassembly unit 4 with an actual terminal interface. FIG. 3 shows an input/output state of the terminal interface 5.

(C) Service suspension processing in below-contracted-speed in the case of a TDM terminal An operation flow of the service suspension processing in below-contracted-speed in the case of a TDM terminal selects "b" in FIG. 6, without going through "a" or "c". A service operation bit that is provided to a terminal input/output according to a transmission speed, and a service suspension bit that is not provided to the terminal input/output are generated on a frame of the terminal interface, with reference to user terminal specification information registered beforehand in the user condition storing unit 9 after having decided the transmission speed by establishing a synchronization with a countering circuit terminating apparatus.

The service suspension timing counts such that the number of bits that are suspended becomes equal in each frame by the reference clock supplied from the reference clock generating unit 6. Further, mask timing is generated so that the buffer unit 3a for communicating with the circuit and the buffer unit 3b for communicating with the terminal may not operate during the suspension period.

Here, a user's contracted circuit speed is registered beforehand in the user condition storing unit 9, which is compared with the synchronized transmission speed in the user condition storing unit 9.

Consequently, service suspend bit information is generated and outputted to the UNI service control unit 7. In the UNI service control unit 7, mask timing is created such that bit positions of service operation and service suspension are common to all frames.

An input/output state of the terminal interface 5 when performing a slowdown from the contracted speed due to a circuit condition is shown by (b) in FIG. 11.

(D) Service suspension processing in below-contracted-speed in the case of terminals, such as a frame relay terminal and an ATM multiplex terminal An operation flow of the service suspension processing in below-contracted-speed in the case of terminals, such as a frame relay terminal and an ATM multiplex terminal and the like, selects "b" in FIG. 6, without going through "a" or "c". A service operation bit that is provided to a terminal input/output according to a transmission speed, and a service suspension bit that is not provided to the terminal input/output are generated on a frame of the terminal interface, with reference to user terminal specification information registered beforehand in the user condition storing unit 9 after having decided the transmission speed by establishing a synchronization with a countering circuit terminating apparatus.

In this case, service is suspended for a bit string starting from a specific frame, as shown in FIG. 3.

Although the appearance of service operation bits and suspension bits is periodic, the period is equal to or longer than a period of the whole frame, which a terminal interface specifies. The period length which the service suspend bits set up is Ts.

Service suspension timing receives information from the user condition storing unit 9, and the UNI service control unit 7 generates the timing of a service suspension.

The service suspension timing continuously chooses and counts the number of bits that carries out a service suspension, within the range of Ts, by the reference clock supplied from the reference clock generating unit 6. During the suspension period, mask timing is generated so that the buffer unit 3a for communicating with the circuit and the buffer unit 3b for communicating with the terminal will not operate.

The frame assembly/disassembly unit 4 assigns a frame structure of actual terminal input/output, and a service operation/suspend bit in accordance with this timing.

An input/output state of the terminal interface 5 when performing a slowdown from the contracted speed, due to a circuit condition is shown in FIG. 12.

(E) Re-negotiation processing based on terminal signal change

An operation flow of re-negotiation processing based on signal change of a terminal connected to a circuit terminating apparatus selects "c" in FIG. 6, with "a" and "c" as alternatives.

When the circuit terminating apparatus side performs a re-negotiation automatically to restore communication at an available maximum speed when a speed slowdown occurs due to circuit conditions during communication, it is desirable to restore when a terminal is not in operation so that communication between terminals may not be affected.

There are two methods of determining whether a terminal is in operation in a circuit terminating apparatus, namely, (a) an idling state (a specific signal pattern is continuously transmitted from the terminal), and (b) frame synchronization with the terminal is lost.

There are cases where the re-negotiation may be performed, namely, at the time of (a), and when (b) is restored.

When an embodiment of the present invention performs the re-negotiation at the time of (a), the re-negotiation is immediately required of the line side synchronous control unit 2 when the specific pattern detecting unit 10 detects a specific pattern (for example, ALL "1") lasting longer than a fixed time in a frame. Consequently, the line side synchronous control unit 2 performs the operation flow of FIG. 6 again.

Alternatively, the terminal interface 5 that always supervises frame synchronization with a terminal, may require the re-negotiation of the line side synchronous control unit 2 when the synchronization is lost, or when resynchronization is obtained after a loss of the synchronization.

Figure 13:
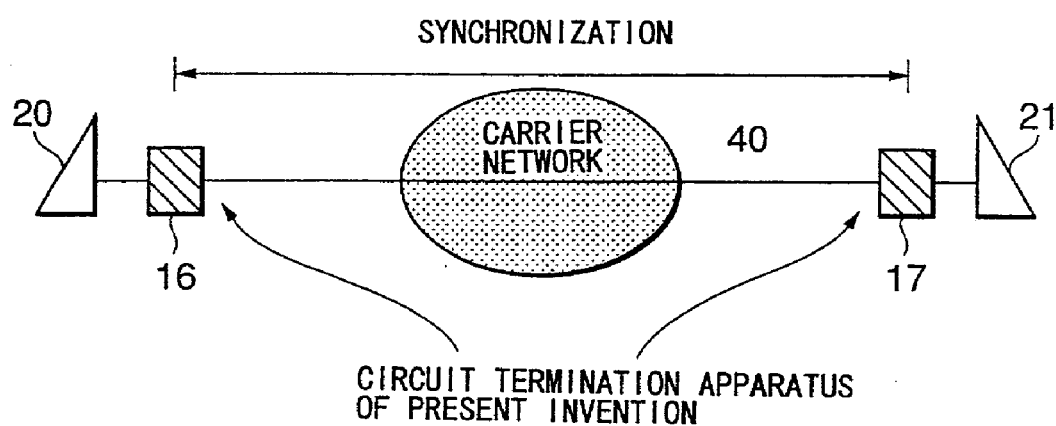
FIG. 13 is a figure for explaining an example wherein the present invention is applied to a circuit terminating apparatus of an end-to-end section.
Figure 14:
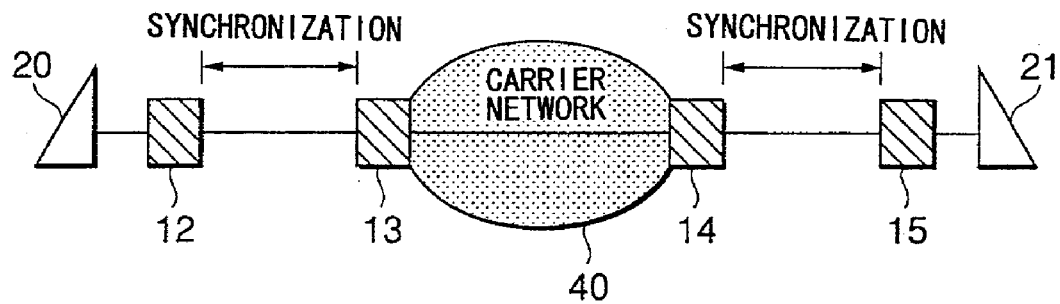
FIG. 14 is a figure for explaining an example wherein the present invention is applied to a circuit terminating apparatus of a subscriber section.

Although the above description generally explains the circuit terminating apparatus concerning high speed data transmission using existing metallic circuits, the circuit terminating apparatus of the present invention can be used as circuit terminating apparatuses 16 and 17 connected to a terminal, which are connected to a communication carrier network 40 (the communication carrier network is equivalent to a metallic circuit in this case) as shown in FIG. 13. Further, as shown in FIG. 14, the circuit terminating apparatuses can be used as circuit terminating apparatuses 12 and 15 in customer's premises, which are connected to terminals, and as circuit terminating apparatuses 13 and 14 provided at access points of the communication carrier network 40 (a section between the circuit terminating apparatus in the customer's premise and the circuit terminating apparatus provided at the access point is equivalent to a metallic circuit in this case.).

The circuit terminating apparatus may be configured by an apparatus that includes a circuit termination function by a personal computer equipped with a functional block, and software.

This invention is not limited to the embodiments specifically disclosed, and various modifications and variations can be made without deviating from the claimed scope of the present invention.

What is claimed is:

1. A circuit termination method comprising:
    updating a transmission speed according to a condition of a circuit between a first circuit terminating apparatus and a second circuit terminating apparatus,
    performing a service suspension and resumption of a predetermined bit position common to each frame of a multi frame,
    adjusting inputting speed and outputting speed of a terminal connected to the first circuit terminating apparatus to the updated transmission speed between the first circuit terminating apparatus and the second circuit terminating apparatus, and a re-negotiation is performed between the first circuit terminating apparatus and the second circuit terminating apparatus starting from a speed faster than a contracted speed of the terminal connected to the first circuit terminating apparatus when frame synchronization between the first circuit terminating apparatus and the second circuit terminating apparatus monitored is lost for a period longer than a predetermined period, and the synchronization is established again for a period longer than a predetermined period.

2. A circuit termination method comprising:

updating a transmission speed according to a condition of a circuit between a first circuit terminating apparatus and a second circuit terminating apparatus, performing a service suspension and resumption of a continuous bit string of a predetermined length starting from a predetermined bit position of a predetermined frame of a multi frame, adjusting an inputting speed and an outputting speed of a terminal connected to the first circuit terminating apparatus to the updated transmission speed between the first circuit terminating apparatus and the second circuit terminating apparatus, and a re-negotiation is performed between the first circuit terminating apparatus and the second circuit terminating apparatus starting from a speed faster than a contracted speed of the terminal connected to the first circuit terminating apparatus when frame synchronization between the first circuit terminating apparatus and the second circuit terminating apparatus monitored is lost for a period longer than a predetermined period, and the synchronization is established again for a period longer than a predetermined period.

3. A circuit termination method comprising:

checking whether a synchronous speed established by a first circuit terminating apparatus and a second circuit terminating apparatus at an operation start is faster or slower than a contracted speed of a terminal connected to the first circuit terminating apparatus, performing a service suspension and resumption of a predetermined bit position common to each frame of a multi frame to update the synchronous speed, if the established synchronous speed is slower than the contracted speed, adjusting an inputting speed and an outputting speed of the terminal to the updated speed between the first circuit terminating apparatus and the second circuit terminating apparatus, and a re-negotiation is performed between the first circuit terminating apparatus and the second circuit terminating apparatus starting from a speed faster than a contracted speed of the terminal connected to the first circuit terminating apparatus when frame synchronization between the first circuit terminating apparatus and the second circuit terminating apparatus monitored is lost for a period longer than a predetermined period, and the synchronization is established again for a period longer than a predetermined period.

4. A circuit termination method comprising:

checking whether a synchronous speed established by a first circuit terminating apparatus and a second circuit terminating apparatus at an operation start is faster or slower than a contracted speed of a terminal connected to the first circuit terminating apparatus, performing a service suspension and resumption of a continuous bit string of a predetermined length starting from a predetermined bit position of a predetermined frame of a multi frame to update the synchronous speed, if the established synchronous speed is slower than the contracted speed, adjusting an inputting speed and an outputting speed of the terminal to the updated speed between the first circuit terminating apparatus and the second circuit terminating apparatus, and a re-negotiation is performed between the first circuit terminating apparatus and the second circuit terminating apparatus starting from a speed faster than a contracted speed of the terminal connected to the first circuit terminating apparatus when frame synchronization between the first circuit terminating apparatus and the second circuit terminating apparatus monitored is lost for a period longer than a predetermined period, and the synchronization is established again for a period longer than a predetermined period.

5. A circuit terminating apparatus comprising:

a service control unit which generates a clock pulse, and performs a service suspension according to user conditions and circuit conditions, said service control unit performing a service suspension and resumption of a predetermined bit position common to each frame of a multi frame when a transmission speed needs to be updated due to a change in circuit conditions between a first circuit terminating apparatus and a second circuit terminating apparatus, adjusting an inputting speed and an outputting speed of a terminal connected to the first circuit terminating apparatus to the updated transmission speed between the first circuit terminating apparatus and the second circuit terminating apparatus, and a re-negotiation is performed between the first circuit terminating apparatus and the second circuit terminating apparatus starting from a speed faster than a contracted speed of the terminal connected to the first circuit terminating apparatus when frame synchronization between the first circuit terminating apparatus and the second circuit terminating apparatus monitored is lost for a period longer than a predetermined period, and the synchronization is established again for a period longer than a predetermined period.

6. A circuit terminating apparatus comprising:

a service control unit which generates a clock pulse, and performs a service suspension according to user conditions and circuit conditions, said service control unit performing a service suspension and resumption of a continuous bit string with a predetermined bit length starting from a predetermined bit position of a predetermined frame of a multi frame when a transmission speed needs to be updated due to a change in circuit conditions between a first circuit terminating apparatus and a second circuit terminating apparatus, adjusting an inputting speed and an outputting speed of a terminal connected to the first circuit terminating apparatus to the updated transmission speed between the first circuit terminating apparatus and the second circuit terminating apparatus and a re-negotiation is performed between the first circuit terminating apparatus and the second circuit terminating apparatus starting from a speed faster than a contracted speed of the terminal connected to the first circuit terminating apparatus when frame synchronization between the first circuit terminating apparatus and the second circuit terminating apparatus monitored is lost for a period longer than a predetermined period, and the synchronization is established again for a period longer than a predetermined period.

7. A circuit terminating apparatus comprising:

a service control unit which generates a clock pulse, and performs a service suspension according to user conditions and circuit conditions, said service control unit checking whether a synchronous speed established between a first circuit terminating apparatus and a second circuit terminating apparatus at starting operation is faster than a contracted speed of a terminal connected to the first circuit terminating apparatus, performing a service suspension and resumption of a predetermined bit position common to each frame of a multi frame to update the synchronous speed, if the established synchronous speed is below the contracted speed, adjusting an inputting speed and an outputting speed of the terminal to the updated speed established between the first circuit terminating apparatus and the second circuit terminating apparatus, and a re-negotiation is performed between the first circuit terminating apparatus and the second circuit terminating apparatus starting from a speed faster than a contracted speed of the terminal connected to the first circuit terminating apparatus when frame synchronization between the first circuit terminating apparatus and the second circuit terminating apparatus monitored is lost for a period longer than a predetermined period, and the synchronization is established again for a period longer than a predetermined period.

8. A circuit terminating apparatus comprising:

a service control unit which generates a clock pulse, and performs a service suspension according to user conditions and circuit conditions, said service control unit checking whether a synchronous speed established by a first circuit terminating apparatus and a second circuit terminating apparatus at starting operation is faster than a contracted speed of a terminal connected to the first circuit terminating apparatus, performing a service suspension and resumption of a continuous bit string of a predetermined bit length starting from a predetermined bit position of a predetermined frame of a multi frame to update the synchronous speed, if the established synchronous speed is below the contracted speed, adjusting an inputting speed and an outputting speed of the terminal to the updated speed established between the first circuit terminating apparatus and the second circuit terminating apparatus, and a re-negotiation is performed between the first circuit terminating apparatus and the second circuit terminating apparatus starting from a speed faster than a contracted speed of the terminal connected to the first circuit terminating apparatus when frame synchronization between the first circuit terminating apparatus and the second circuit terminating apparatus monitored is lost for a period longer than a predetermined period, and the synchronization is established again for a period longer than a predetermined period.

9. The circuit termination method as claimed in claim 1, wherein a re-negotiation is performed between the first circuit terminating apparatus and the second circuit terminating apparatus starting from a speed faster than a contracted speed of the terminal connected to the first circuit terminating apparatus when the first circuit terminating apparatus detects a specific pattern transmitted from the terminal connected to the first circuit terminating apparatus.

10. The circuit termination method as claimed in claim 1, wherein a re-negotiation is performed between the first circuit terminating apparatus and the second circuit terminating apparatus starting from a speed faster than a contracted speed of the terminal connected to the first circuit terminating apparatus when frame synchronization between the first circuit terminating apparatus and the second circuit terminating apparatus monitored is lost for a period longer than a predetermined period.

11. The circuit terminating apparatus as claimed in claim 5, comprising a specific pattern detecting unit which detects a specific pattern, thereby when the first circuit terminating apparatus detects the specific pattern that the terminal connected to the first circuit terminating apparatus transmits, the first circuit terminating apparatus establishes synchronization again with the second circuit terminating apparatus starting from a transmission speed faster than a contracted speed of the terminal connected to the first circuit terminating apparatus.

12. The circuit terminating apparatus as claimed in claim 5, comprising a synchronization monitoring unit that monitors a synchronization status, thereby when the synchronization is lost for a period longer than a predetermined period, the first circuit terminating apparatus establishes synchronization again with the second circuit terminating apparatus starting from a transmission speed faster than a contracted speed of the terminal connected to the first circuit terminating apparatus.

13. The circuit terminating apparatus as claimed in claim 5, comprising a synchronization monitoring unit that monitors a synchronization status, thereby when the synchronization is lost for a period longer than a predetermined period and when afterwards synchronization is re-established and maintained for a period longer than a predetermined period, the first circuit terminating apparatus establishes synchronization again with the second circuit terminating apparatus starting from a transmission speed faster than a contracted speed of the terminal connected to the first circuit terminating apparatus.

* * * * *